United States Patent
Meier et al.

(10) Patent No.: US 9,422,740 B2
(45) Date of Patent: Aug. 23, 2016

(54) SYSTEM FOR RETROFITTING LOCAL ENERGY MODULES IN RAIL NETWORKS

(71) Applicant: S. E. Track AG, Zug (CH)

(72) Inventors: Balthasar Meier, Erlenbach (CH); Christoph Ott, Worb (CH)

(73) Assignee: S. E. Track AG (CH)

( * ) Notice: Subject to any disclaimer, the term of this patent is extended or adjusted under 35 U.S.C. 154(b) by 0 days.

(21) Appl. No.: 14/412,502

(22) PCT Filed: Jun. 26, 2013

(86) PCT No.: PCT/EP2013/063361
§ 371 (c)(1),
(2) Date: Jan. 2, 2015

(87) PCT Pub. No.: WO2014/005897
PCT Pub. Date: Jan. 9, 2014

(65) Prior Publication Data
US 2015/0322688 A1   Nov. 12, 2015

(30) Foreign Application Priority Data

Jul. 4, 2012 (CH) .................................... 1036/12

(51) Int. Cl.
*E04D 13/18* (2014.01)
*E04H 12/20* (2006.01)
(Continued)

(52) U.S. Cl.
CPC ................. *E04H 12/20* (2013.01); *F24J 2/523* (2013.01); *F24J 2/5241* (2013.01); *F24J 2/5417* (2013.01); *H02S 20/00* (2013.01); *F24J 2002/5458* (2013.01); *Y02E 10/47* (2013.01); *Y02E 10/50* (2013.01)

(58) Field of Classification Search
CPC ........ E04H 12/20; F24J 2/5417; F24J 2/5241; F24J 2/523; F24J 2002/5458; H02S 20/00; Y02E 10/50
See application file for complete search history.

(56) References Cited

U.S. PATENT DOCUMENTS 4,697,396 A    10/1987  Knight
8,212,140 B2 *  7/2012  Conger .................. F24J 2/5241
                                            126/561

(Continued)

FOREIGN PATENT DOCUMENTS

CH      701857 A2    3/2011
DE    19530305 A1    2/1997
EP     0802324 A1   10/1997

OTHER PUBLICATIONS

International Search Report dated Dec. 11, 2013 for PCT/EP2013/063361.

*Primary Examiner* — Basil Katcheves
*Assistant Examiner* — Joshua Ihezie
(74) *Attorney, Agent, or Firm* — Abel Law Group, LLP (57) ABSTRACT

A system for retrofitting energy supply modules in the region of a traffic route is provided. Supporting cables extend transversely over the traffic route and support a plurality of solar panels, which can be mounted on the transverse supporting cables. Elongated mounting elements fastened to each support mast act to reinforce the support masts and accommodate electronic system components. The solar panels are adjusted about a horizontal and/or a vertical axis by means of cable sheaves. The supporting cables are fastened at a lower region of the support masts for instance with micropiles so that they can be tensioned. The forces exerted by the solar panels on the transverse support cables are conducted through the transverse supporting cables via at least one first redirection element and into the lower region of the support mast.

12 Claims, 9 Drawing Sheets

(51) Int. Cl.
  *F24J 2/52* (2006.01)
  *H01L 31/042* (2014.01)
  *F24J 2/54* (2006.01)

(56) References Cited

U.S. PATENT DOCUMENTS

| | | | |
|---|---|---|---|
| 8,448,390 B1* | 5/2013 | Clemens | F24J 2/5258 126/623 |
| 2006/0095199 A1* | 5/2006 | Lagassey | G07C 5/008 701/117 |
| 2008/0283112 A1* | 11/2008 | Conger | F24J 2/5241 136/244 |
| 2009/0040750 A1* | 2/2009 | Myer | F21S 8/083 362/183 |
| 2009/0186745 A1* | 7/2009 | Lewiston | F03D 9/007 482/2 |
| 2010/0183443 A1* | 7/2010 | Thorne | F03D 9/007 416/146 R |
| 2010/0294265 A1* | 11/2010 | Baer | F24J 2/5241 126/680 |
| 2010/0314509 A1* | 12/2010 | Conger | F24J 2/5241 248/121 |
| 2014/0151616 A1* | 6/2014 | Carroll | H02G 1/04 254/134.3 R |

\* cited by examiner

SYSTEM FOR RETROFITTING LOCAL ENERGY MODULES IN RAIL NETWORKS

TECHNICAL FIELD OF THE INVENTION

The present invention relates to a system for setting up decentralized energy sources, which e.g. are able to be installed over an existing railway line. In particular, but not exclusively, the invention relates to a system for retrofitting of solar collectors and/or wind energy collectors on existing masts or other structural elements in the region of railways.

STATE OF THE ART

It is known e.g. from the European patent application EP0802324 or the German patent application DE19530305 to use the empty surroundings and the existing structures off of a railway line for the generation of energy, and, to be more precise, through the provision of wind or solar power facilities. Such facilities however require very large, very stable structures (such as masts of reinforced concrete) to overcome the forces which are caused by the presence of the panels or respectively turbines. Therefore these systems can only be set up in new structures or respectively during the renovation of the railway lines, which leads to an interruption of the train traffic.

DISCLOSURE OF INVENTION

It is thus an object of the present invention to propose a new system for subsequently setting up of energy modules in the vicinity of railway lines which do not have the drawbacks of the state of the art.

Thereby it is in particular the object of the present invention to provide a system for retrofitting a railway line with energy modules without however interrupting the railway traffic for longer periods of time.

According to the present invention, these objects are attained above all through the elements of the two independent claims. Further advantageous embodiments follow moreover from the dependent claims and the specification.

In particular the objects of the invention are achieved in that a system is provided which serves the retrofitting of energy supply modules in the region of a traffic route, which traffic route has along both longitudinal sides a multiplicity of support masts, whereby the system has a multiplicity of transverse supporting cables, which extend over the traffic route, transversely to the traffic route, between opposite support masts, and has a multiplicity of solar panels, which are mountable over the traffic route on the transverse supporting cables, whereby, for each support mast, the system has at least one elongated mounting element, which is attachable the support mast, and which reinforces the stiffness of the support mast over most of the length of the support mast; whereby the system has at least one first redirection element, which is attachable on an upper region of the support mast, and by means of which a transverse supporting cable is able to be redirected from its transverse orientation into a substantially vertical orientation; whereby the system has at least one attachment element, which is attachable to a lower region of the support mast, and by means of which a substantially vertically oriented supporting cable is able to be anchored in a tensioned way to the said lower region; whereby the forces which are exerted by the solar panels on the transverse supporting cable are led through the transverse supporting cable via the at least one first redirection element and into the lower region of the support mast. All system elements can be designed in such a way that they are able to be constructed or respectively retrofitted on the existing infrastructure of the traffic route, and, to be precise, without the traffic having to be interrupted for a longer period of time.

According to an embodiment variant of the invention the supporting cables are fixed on a base of the support mast.

According to another embodiment variant of the invention the system has a second redirection element, which is attachable on the upper region of the support mast; and at least one control cable, which is attachable on the lower region of the support mast and which serves the purpose of alignment of at least one solar panel, whereby the alignment of the solar panel is able to be carried out through an adjustment of the at least one second redirection element. Thus, for example, the adjustment of the solar panel can take place independently of the tensioning of the supporting cable. The redirection elements can be designed as cable sheaves, for example.

According to a further embodiment variant of the invention, the system has at least one wind turbine which is designed in such a way that it is attachable on a second upper region of the support mast.

According to another embodiment variant of the invention, the system has at least one first communication unit, by means of which a wireless communication link is able to be established between at least one traffic participant on the traffic route and at least one mobile radio network and/or at least one fixed network.

According to a further embodiment variant of the invention, the system has:

an energy storage unit;

a feed unit for feed of current, which is generated by the at least one solar panel and/or by the at least one wind turbine, into the energy storage unit and/or into a power supply network of the traffic route;

a current transformer, by means of which electrical features of the current generated by the at least one solar panel and/or by the at least one wind turbine are adaptable to the charging or respectively feed requirements of the energy storage unit or respectively of the power supply network of the traffic route;

a control unit for control of mechanical and/or electrical functions of components of the system, which are mounted on the support mast and/or on the supporting cables;

the said at least one first communication unit;

and/or a second communication unit, by means of which data and/or control commands are able to be exchanged between the control unit and a remote central control unit.

According to another embodiment variant of the invention, the mounting element has a housing, in which the energy storage unit, the feed unit, the current transformer, the control unit, the first communication unit and/or the second communication unit are able to be accommodated.

According to a further embodiment variant of the invention the first communication unit is attached on top of each of the said support masts or on the wind turbine.

According to another embodiment variant of the invention the mounting element has an elongated, substantially prism-shaped profile with a substantially trapezoidal cross section.

According to a further embodiment variant of the invention the system has at least one upright solar panel, which is mountable on the said mounting element.

According to another embodiment variant of the invention the upright solar panels have at least one adjustment element by means of which adjustment element the upright solar panel is adjustable with a fixed or movable southern orientation.

In the following the embodiment variants of the present invention will be described with reference to examples. The examples of the embodiments are illustrated by the following attached FIGS. 1 to 9, whereby.

Figure 1:
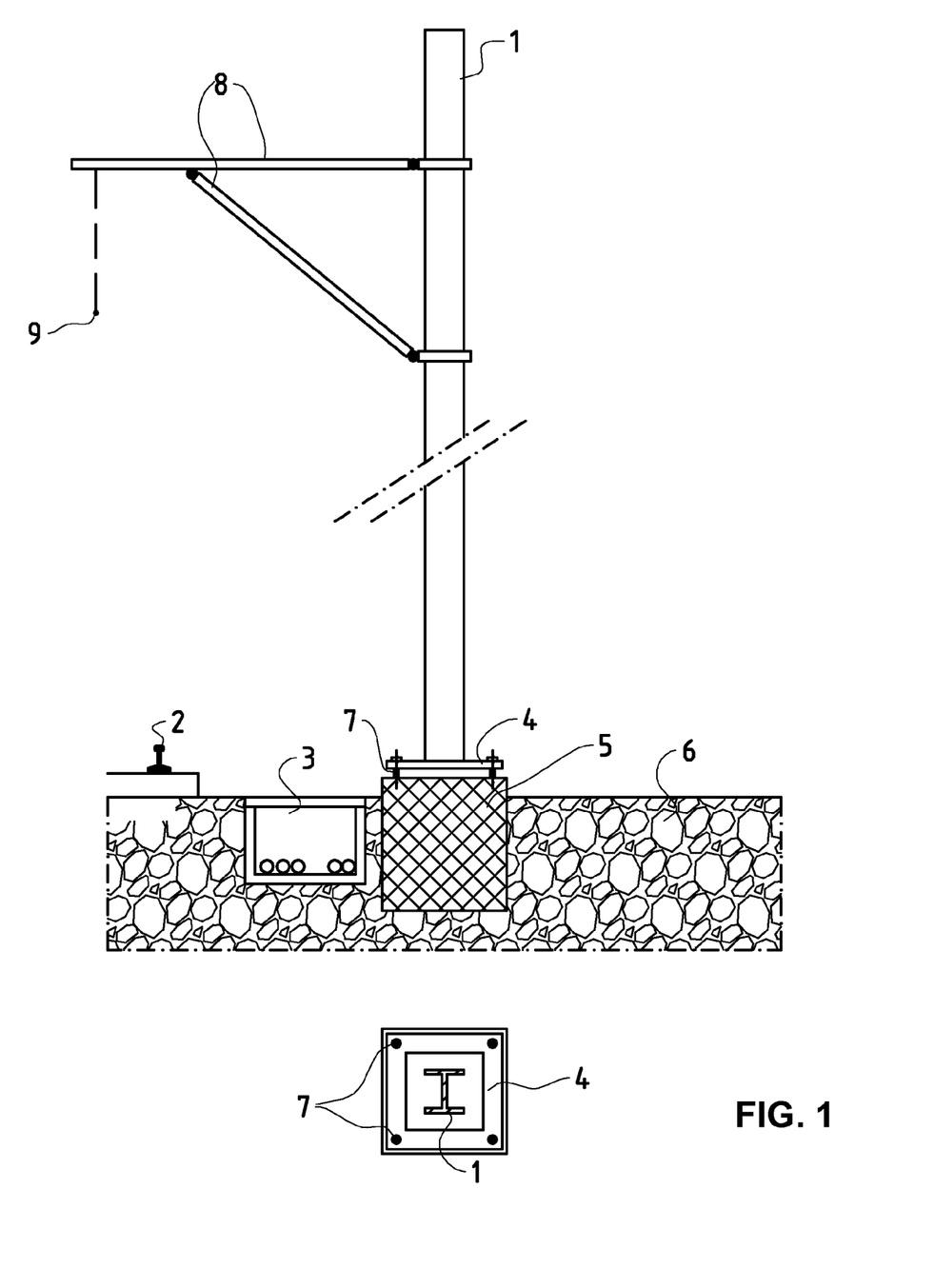
FIG. 1 shows in schematic cross section a representation of a support mast which is known from the state of the art.

A common support mast, as is depicted in FIG. 1, has a vertical, H-shaped profile 1 of e.g. galvanized steel. The mast is welded to a base plate 4, and fixed e.g. by means of screws to a base 5. The base 5 can e.g. be prefabricated and placed in the gravel bed 6, or it can be cast from concrete on site. FIG. 1 also shows a track 2 of the traffic route, as well as a duct 3 for power lines, communications lines or other lines.

The mast 1 depicted in FIG. 1 bears in a known way a high-voltage power line 9 for driving train traffic which drive on the traffic route. In this description a track railway is taken as an example, whereby to be understood by the term "traffic route" are also other kinds of transport or communication connections, which are located outside, and which require a power supply (for example for driving, illumination or communication) such as e.g. roads, highways, canals, aerial funiculars, racetracks, cogwheel railways, pedestrian walkways, etc.

Figure 2:
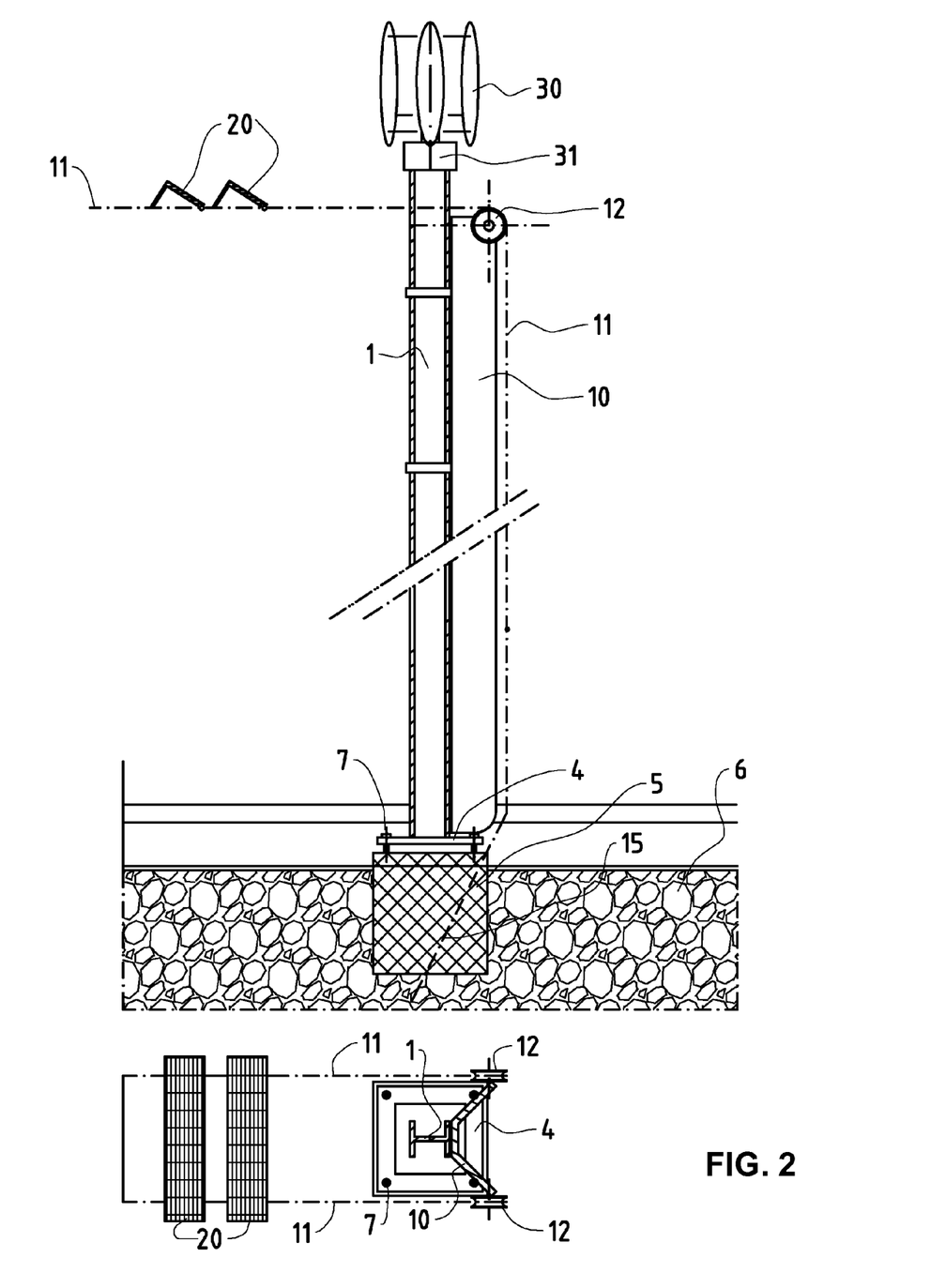
FIG. 2 shows in schematic cross section a representation of a support mast which is suitable for use in a system according to the invention.

FIG. 2 shows a similar, H-shaped support mast 1 which is retrofitted with a mounting element 10 according to the invention. Placed, by means of a mount 31, in an upper region of the mast 1 (on its upper tip in this example) is a vertical wind power rotor 30. Solar panels 20 are suspended by transverse cables 11 in the space over the traffic route.

The transverse cables 11 are fixed in the lower region of the mast 1 or respectively on the base 5, and run along the mounting element 10 to an upper region, where they are each redirected via a redirection element 12 (for example a cable sheave) from a vertical into a horizontal orientation. The transverse cables 11 are preferably fixed on the lower region by means of micropiles. Micropiles can be subsequently inserted e.g. in an existing base and/or in the ground without disturbing existing structures (concrete, gravel, etc.), and provide a strong attachment point to which a cable 11 can be attached in a tensioned way.

The transverse cables 11 are sufficiently tensioned in order to bear forces to be expected that act on the solar panels (weight of the panels, wind, rain or snow loads, vibration, etc.).

The mounting element 10 illustrated by way of example has a trapezoidal cross section, and serves primarily to stiffen and reinforce the support mast 1, so that the tension forces are led in the horizontal sections of the transverse cable 11 via the redirection elements 12 into the ground region 5, 6. The trapezoidal shape of the mounting element has a narrower side, which is fixed to the mast, and a broader, open side, and thereby forms a concave space in which system components can be accommodated. The lobes of the broader side also provide a frame on which the cable sheaves 12 can be rotationally mounted.

The solar panels 20 can be attached obliquely on the transverse cables, as depicted in FIG. 2.

Figure 3:
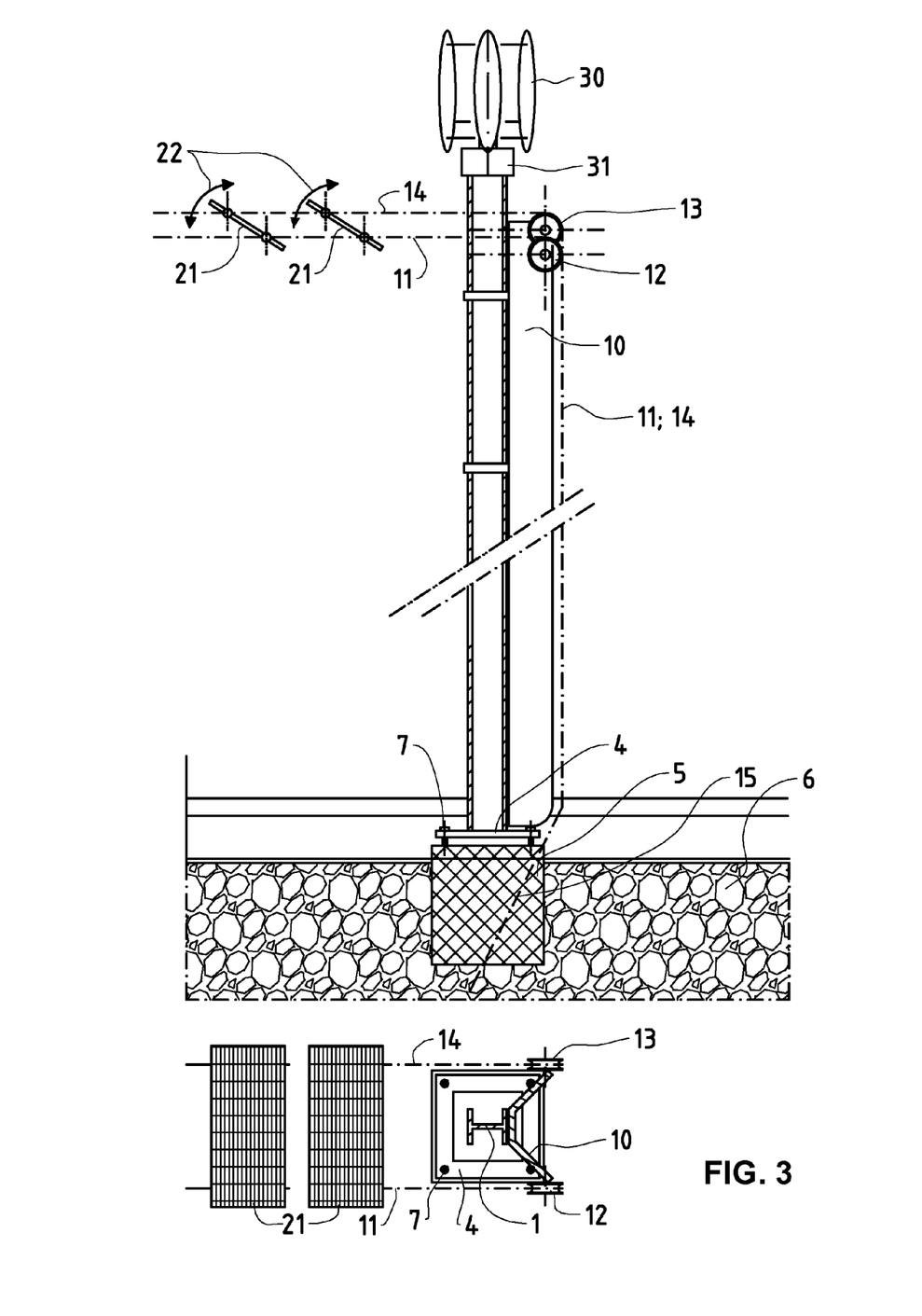
FIGS. 3 and 4 show in schematic cross section representations of a support mast provided with adjustable solar panels, which support mast is suitable for use in a system according to the invention.

FIG. 3 shows another variant of the retrofitting system according to the invention. In this variant the inclination of the solar panels is controlled by the transverse cables 11, 14. One (13) of the redirection elements 12 and 13 can, for example, be offset somewhat higher than the other (12), whereby a change in the inclination of the solar panels results when the two transverse cables 11 and 14 are moved longitudinally towards one another. The solar panels 21 can be attached to the transverse cables 11 and 14 e.g. by means of rotary fittings (for example borne or provided with articulations).

Figure 4:
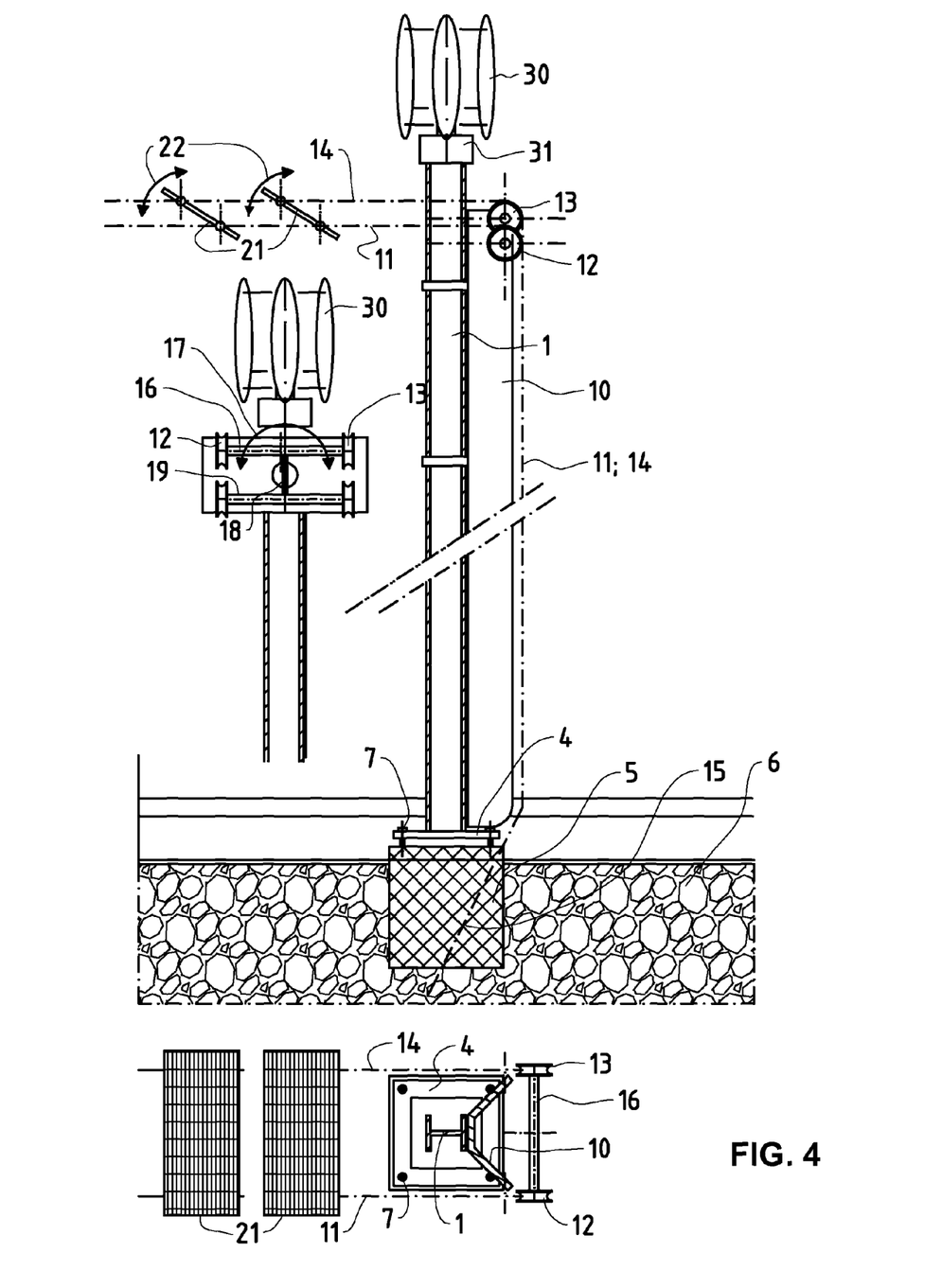

Another variant of the control of the solar panels is depicted in FIG. 4. In this variant the redirection elements (e.g. cable sheaves) are mounted on rotational shafts 16, 19, which are rotatable together about a common orthogonal adjustment shaft 18. The adjustment of the inclination of the solar panels thus takes place through a rotation of the rotational shafts 16 and 19 about the adjustment shaft 18.

Figure 5:
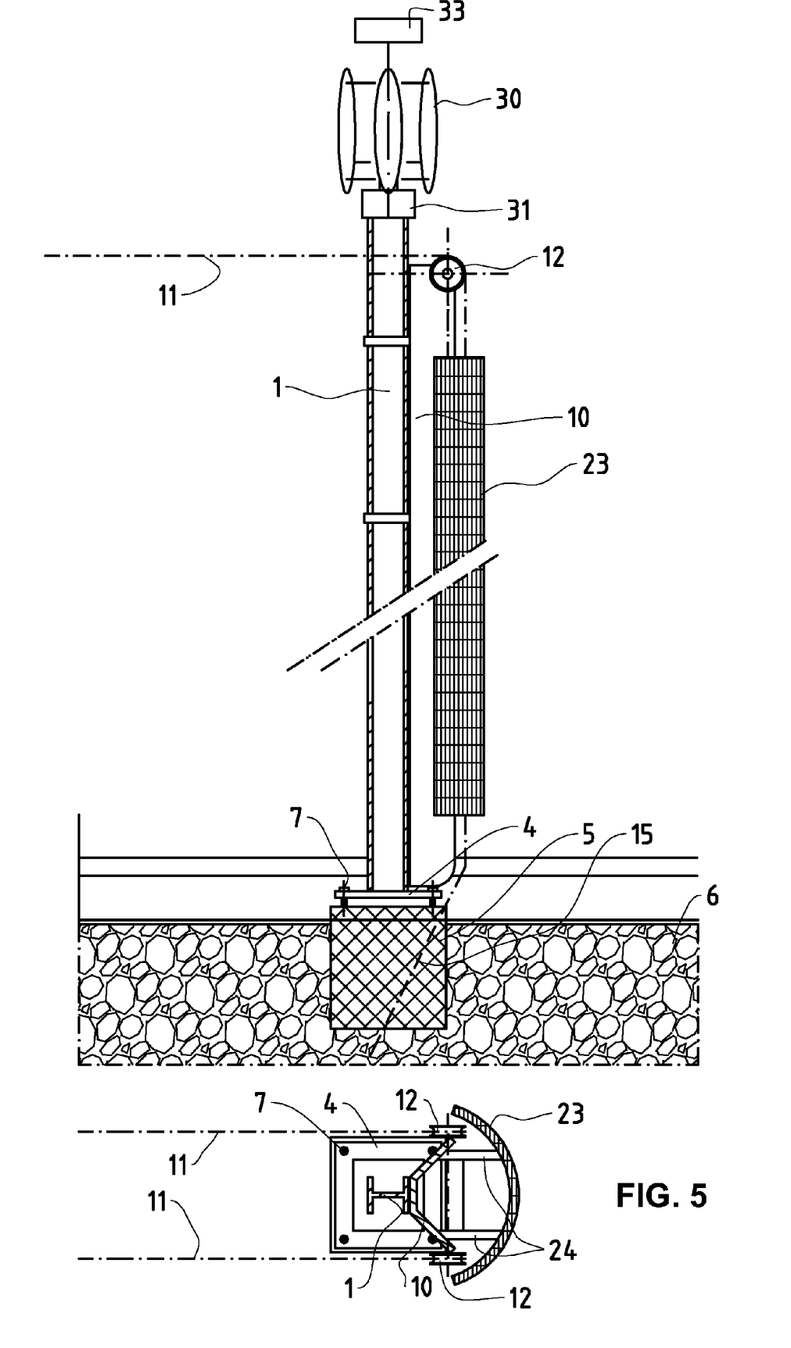
FIGS. 5 and 6 show in schematic cross section a representation of a support mast equipped with integrated electronic communication components, which support mast is suitable for use in a system according to the invention.
Figure 6:
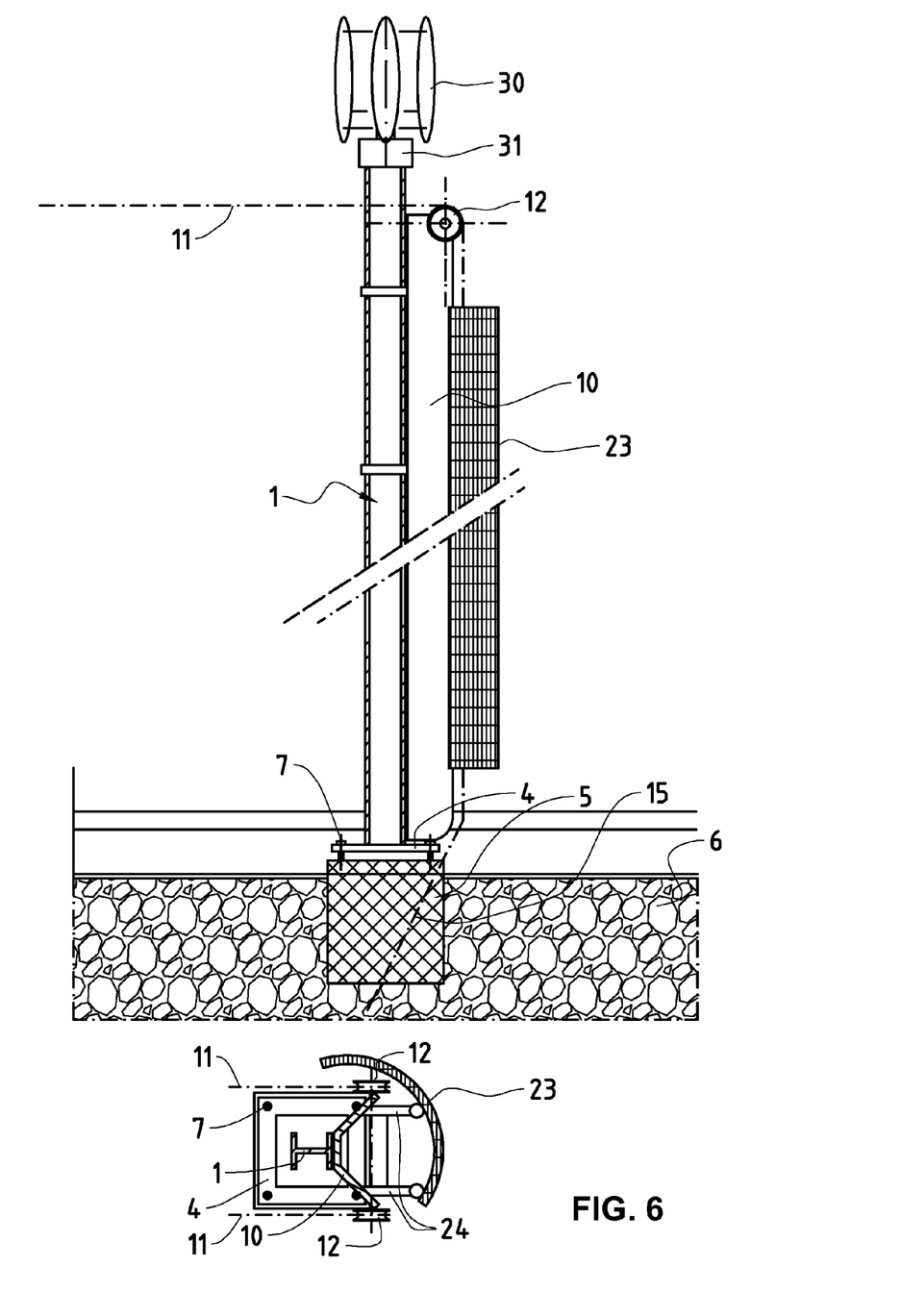

A further variant of the retrofitting system according to the invention is depicted in FIG. 5. In this variant, which can be used with or without the various above-described solar panels 20, 21, the mounting element 10 has a vertical solar panel 23, which can be installed on the mounting element 10. This vertical solar panel 23 can be designed in such a way that it serves both as solar energy collector and as cover for the interior space of the mounting element 10. FIG. 6 shows a similar variant, in which the vertical solar panel 23 is set up in a way pivotable about a vertical axis, and, to be precise, e.g. on bearings 24, so that the southern orientation of the solar panel 23 can be set once or adjusted continuously. The vertical solar panel can be designed as an elongated, partially cylindrical section, as shown in FIGS. 5 and 6.

Figure 7:
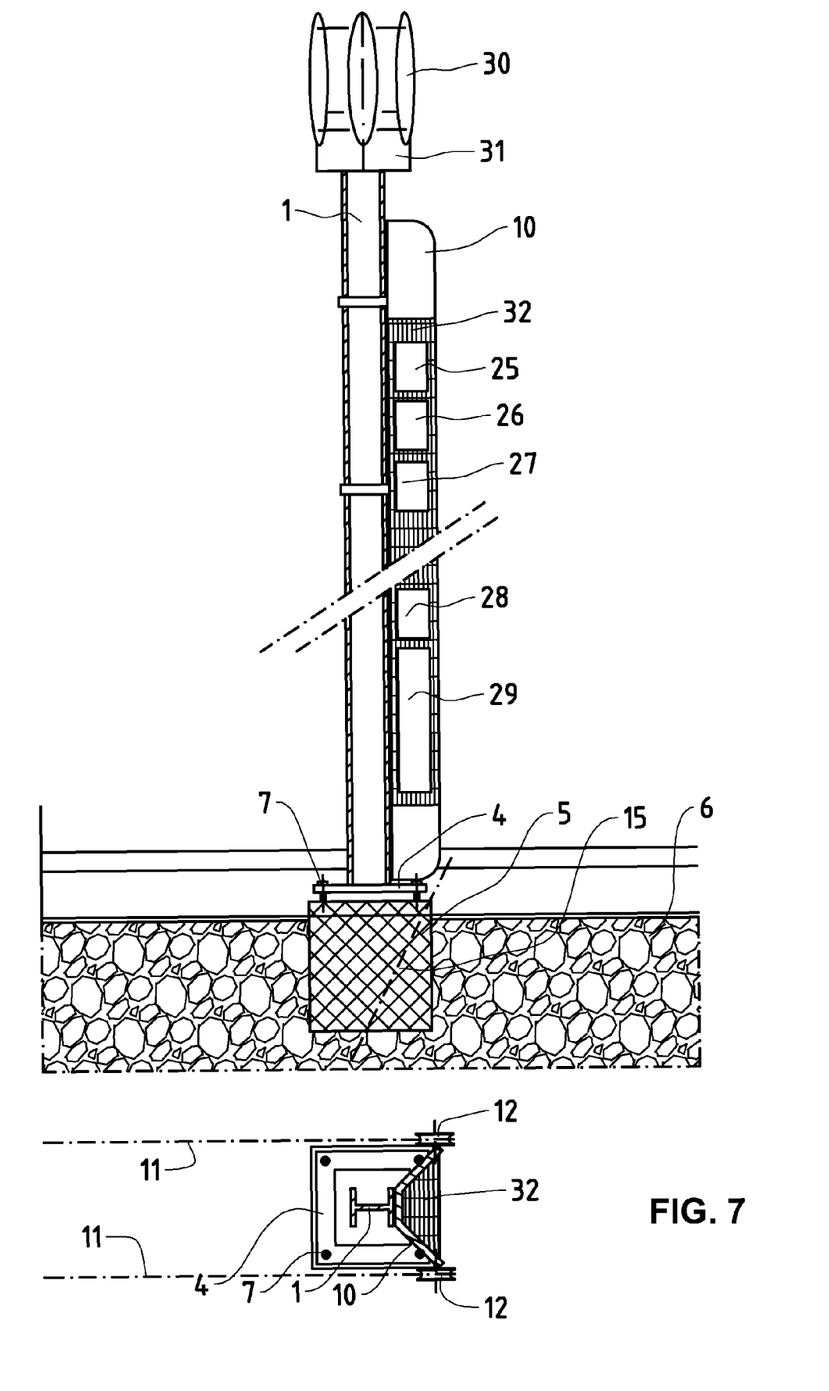
FIG. 7 shows in schematic cross section a representation of a support mast provided with a curved or bent, vertical solar panel which is suitable for use in a system according to the invention.

FIG. 7 shows another variant of a retrofitting system according to the invention in which one or more of the system components 25, 26, 27, 28, 29 are accommodated in the inner space of the mounting element.

Accommodated can be, for example, an energy storage unit 29, such as a storage battery or capacitor, in order to store the electric current generated by the solar panels 20, 21 and/or by the wind turbine 30. The stored energy can then be fed into the power supply network 9 of the traffic route, or can be used for other purposes, such as e.g. for the various other system components.

The system can have e.g. a current transformer or respectively transformer 25, which can also be accommodated in the inner space of the mounting element. By means of such a current transformer or respectively transformer 25 the static and/or dynamic electrical characteristics (frequency, voltage, etc.) can be adapted e.g. to the charging or respectively feed requirements of the energy storage unit 29 or respectively of the power supply network 9 of the traffic route 2.

A control unit 28 for control of mechanical and/or electrical functions of the system can also be accommodated in the inner space. Such a control system can be used, for example, to activate the longitudinal shift of one or more of the transverse cables 11, 14, and thereby the inclination of the solar panels 20, 21. Since the transverse cables 11, 14 run through the mounting element or respectively close to the mounting element, the control unit can change the longitudinal position of the transverse cables e.g. by means of a servo unit or traction unit.

Further system components can likewise be accommodated in the inner space, such as e.g. a communication unit 33. To be understood by this term is, for example, a wireless (such as GSM- or Wi-Fi, etc). and/or a fixed communication unit. Such a communication unit, which is present in many masts distributed along the traffic route, can provide e.g. a continuous communication service (such as Internet, telephone, television) for traffic participants of the traffic route. Moreover such a communication unit can exchange information on the functioning of the system and/or the traffic route with a remote central control unit.

The control unit 28 can communicate, for example, with the central control unit in order to optimize the current feed into the power supply network 9. Thus the supply at a particular mast 1 can be time-controlled, for example, so that stored energy is only fed into the railway network or respectively the line 9 when a train is passing by. In this way the total amount of electric current over the power network or respectively over the line 9 can be minimized.

In a similar way the control unit 28 can be configured in such a way that the communication unit(s) become(s) active only when needed (for example upon approach of a train). Thus the energy load of the communications (e.g. Internet or mobile telephone connections) can be minimized, whereby the safety is optimized. This optimization can be carried out by the control unit 28 and/or depending upon instructions or respectively information of the control unit.

Figure 8:
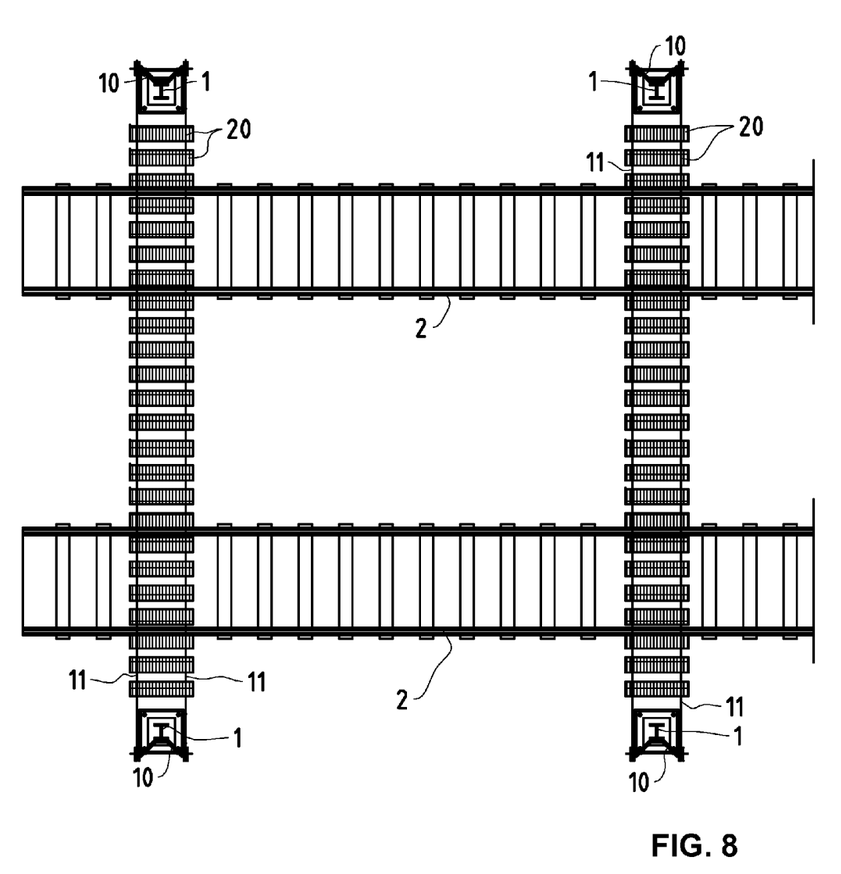
FIGS. 8 and 9 show in schematic plan view two possible configurations of the solar panels or respectively support masts of the invention over a traffic route.

FIG. 8 shows a configuration according to the invention of solar panels 20 (static or adjustable), in which the transverse cables 11 extend transversely e.g. in pairs over the traffic route (in this example a two-track railway line), between two support masts 1. Each support mast is retrofitted with a mounting element 10 according to the invention, as described above. Each of the solar panels 20 is attached to a pair of transverse cables.

Figure 9:
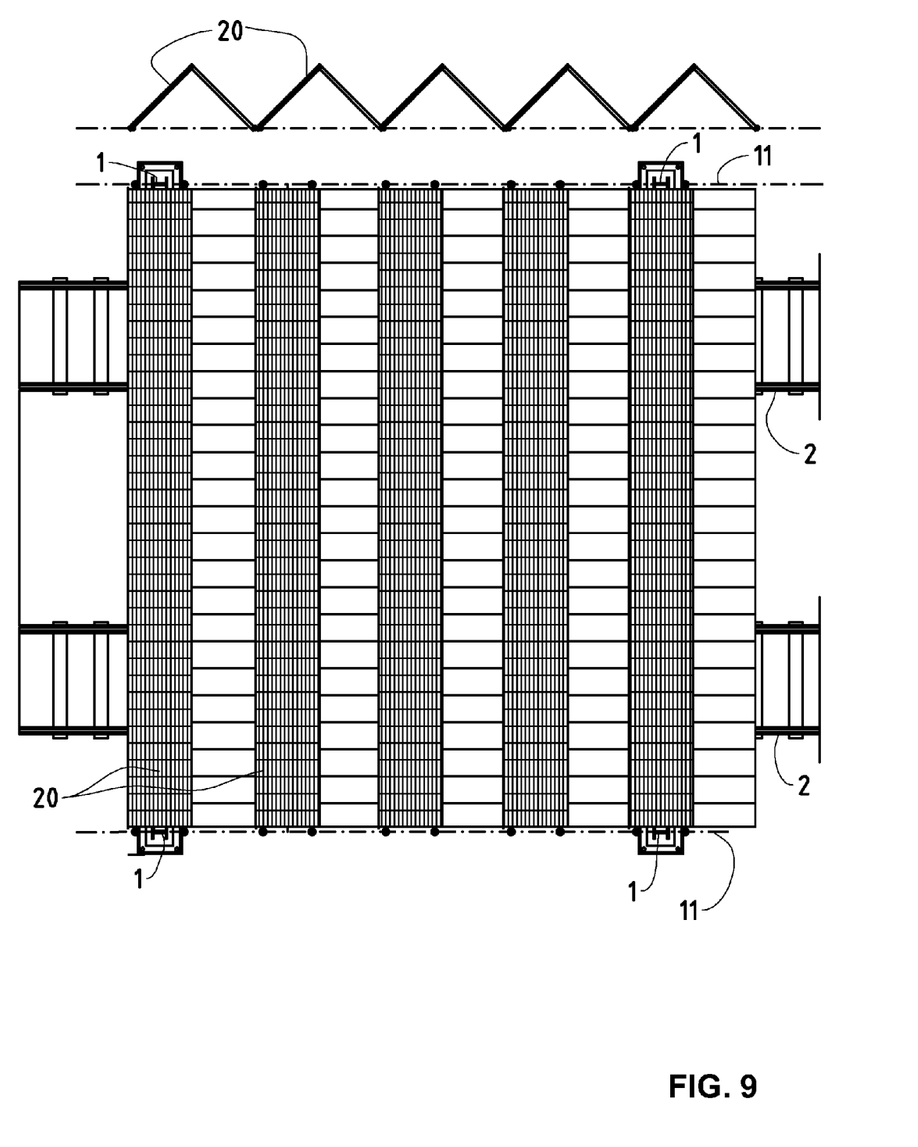

FIG. 9 shows another configuration according to the invention of solar panels 20 over a two-track railway line. In this example the transverse cables 11 are disposed substantially parallel to the traffic route between support masts 1. Mounting elements (not shown) can be used for reinforcement of the masts 1, and the solar panels 20 can be oriented transversely over the rails, whereby each solar panel extends between two transverse cables.

In both of the examples depicted in FIGS. 8 and 9 the solar panels are preferably disposed in such a way that they shade the traffic passing by. In this way further energy is saved, for example for the airconditioning of the trains.

As mentioned at the beginning, a common aim of the different variants according to the invention is that a power generation system can be retrofitted on existing infrastructure and this can be done without longer interruption of the traffic.

Finally it is to be pointed out that the embodiment variants described here by way of example only represent a selection from among possible implementations of the inventive concept and in no way should they be viewed as limiting. One skilled in the art will understand that many other implementations of the invention are possible without losing sight of the essential features of the invention.

The invention claimed is:

1. System for retrofitting energy supply modules in the region of a traffic route, which traffic route has along both longitudinal sides a multiplicity of support masts, whereby the system comprises:
 a multiplicity of transverse supporting cables configured to be extended over the traffic route transversely to the traffic route, between opposite said support masts;
 a multiplicity of solar panels, which are mountable over the traffic route on the transverse supporting cables;
 at least one elongated mounting element, which is attachable to a respective said support mast, and which reinforces the stiffness of said respective support mast over most of the length thereof;
 at least one first redirection element, which is attachable on an upper region of a respective said support mast, and by means of which one of the transverse supporting cables is redirected from its transverse orientation into a substantially vertical orientation;
 at least one attachment element, which is attachable to a lower region of a respective said support mast, and by means of which a substantially vertically oriented said supporting cable is anchored in a tensioned way to the lower region;
 whereby the forces which are exerted by the solar panels on the transverse supporting cable are led through the transverse supporting cable via the at least one first redirection element and into the lower region of each of the support masts;
 at least one first communication unit configured to establish a wireless communication link selected from the group consisting of: between at least one traffic participant on the traffic route and at least one mobile radio network and between at least one traffic participant on the traffic route and at least one fixed network;
 an energy storage unit;
 an optional power supply network of the traffic route;
 a feed unit for feed of current, which is generated by the at least one solar panel, into at least one of the energy storage unit and the power supply network of the traffic route;
 a current transformer, by means of which electrical features of the current generated by the at least one solar panel are adaptable to the charging or respectively feed requirements of the energy storage unit or respectively of the power supply network of the traffic route;
 a control unit for control of at least one of mechanical and electrical functions of components of the system, which is mounted on at least one of the support masts and the supporting cables;
 an optional second communication unit;
 wherein at least one of the communication unit and the second communication unit enable at least one of data and control commands to be exchanged between the control unit and a remote central control unit.

2. System according to claim 1, whereby the lower region of each of the support masts is a base of each of the support masts.

3. System according to claim 1, further comprising:
 at least one second redirection element, which is attachable on the upper region of each of the support masts; and
 at least one control cable, which is attachable on the lower region of each of the support masts and which serves the purpose of alignment of at least one solar panel, whereby the alignment of the solar panel is able to be carried out through an adjustment of the at least one second redirection element.

4. System according to claim 3, whereby the at least one first redirection element and/or the at least one second redirection element has at least one cable sheave.

5. System according to claim 1, further comprising at least one wind turbine configured to be attached on a second upper region of a respective said support mast.

6. System according to claim 1, whereby the mounting element has a housing that accommodates a component selected from the group consisting of: the energy storage unit, the feed unit, the current transformer, the control unit, the first communication unit, the second communication unit and combinations thereof.

7. System according to claim 1, whereby the first communication unit is attachable on top of each of the support masts.

8. System according to claim 1, whereby the mounting element has an elongated, substantially prism-shaped profile with a substantially trapezoidal cross section.

9. System according to claim 8, further comprising at least one upright solar panel, which is attachable to the mounting element.

10. System according to claim 9, whereby the upright solar panel has at least one adjustment element configured to adjust the upright solar panel with a fixed or movable southern orientation.

11. System according to claim 5 wherein
said feed unit feeding current, which is generated by at least one of said solar panel and said wind turbine, into at least one of the energy storage unit and the power supply network of the traffic route;
said current transformer, by means of which electrical features of the current generated by at least one of said solar panel and said wind turbine are adaptable to the charging or respectively feed requirements of the energy storage unit or respectively of the power supply network of the traffic route.

12. System according to claim 1, whereby the first communication unit is attachable on the wind turbine.

\* \* \* \* \*